United States Patent
Kim (10) Patent No.: US 6,243,418 B1
(45) Date of Patent: Jun. 5, 2001

(54) METHOD AND APPARATUS FOR ENCODING A MOTION VECTOR OF A BINARY SHAPE SIGNAL

(75) Inventor: Jin-Hun Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/132,663

(22) Filed: Aug. 12, 1998

(30) Foreign Application Priority Data

Mar. 30, 1998 (KR) .................................................. 98-11093

(51) Int. Cl.[7] .................................................. H04N 7/12
(52) U.S. Cl. .............................. 375/240.12; 375/240.02; 375/240.08; 382/243
(58) Field of Search ........................ 375/240.12, 240.13, 375/240.14, 240.15, 240.16, 240.17, 240.08, 240.02; 348/409.1, 412.1, 414.1, 416.1, 415.1; 386/111; 382/236, 238, 237, 243

(56) References Cited

U.S. PATENT DOCUMENTS

| | | | |
|---|---|---|---|
| 5,623,310 | 4/1997 | Kim ................................... | 348/394.1 |
| 5,751,363 | * 5/1998 | Miyamoto ........................... | 348/416 |
| 5,832,124 | * 11/1998 | Sato et al. ........................... | 382/238 |
| 5,859,668 | * 1/1999 | Aono et al. .......................... | 348/416 |
| 5,973,743 | * 10/1999 | Han .................................... | 348/416 |
| 5,991,447 | * 11/1999 | Eifrig et al. ......................... | 382/236 |
| 6,049,567 | * 4/2000 | Han .................................... | 375/240 |
| 6,049,631 | * 4/2000 | Kim ..................................... | 382/239 |
| 6,094,225 | * 7/2000 | Han .................................... | 348/416 |

FOREIGN PATENT DOCUMENTS

| | | | |
|---|---|---|---|
| 0485230 | 5/1992 | (EP) | ............................. H04N/07/12 |
| 0720377 | 7/1996 | (EP) | ............................. H04N/7/26 |
| 0123456-A2 | * 1/2000 | (EP) . | |
| 9716030 | 5/1997 | (WO) | ............................. H04N/7/36 |

OTHER PUBLICATIONS

Lee et al., "Binary shape coding using 1–D distance values from baseline", International Conf. on Image Processing, Oct. 1997, pp. 508–511.*

Osterman et al., "Coding of arbitrarily shaped video objects in MPEG–4", International Conf. on Image Processing, Oct. 1997, pp. 496–499.*

* cited by examiner

Primary Examiner—Vu Le
(74) Attorney, Agent, or Firm—Pennie & Edmonds LLP (57) ABSTRACT

An apparatus encodes a video signal composed of texture information and shape information by selectively using a progressive and an interlaced coding technique. The shape information is divided into a multiplicity of BABs of M×N pixels having one of a first and a second binary values and the texture information has a plurality of macroblocks of the same number of pixels as a BAB. Specifically, the apparatus determines a motion vector of a target BAB of the shape information based on a corresponding motion vector predictor selected among candidate motion vectors including frame-based and field-based motion vectors for BABs which surround the target BAB and have been previously encoded and frame-based and field-based motion vectors for macroblocks which surround the macroblock corresponding to the target BAB and also have been previously encoded according to predetermined priority, and encodes the motion vector of the target BAB.

16 Claims, 7 Drawing Sheets

METHOD AND APPARATUS FOR ENCODING A MOTION VECTOR OF A BINARY SHAPE SIGNAL

FIELD OF THE INVENTION

The present invention relates to a method and an apparatus for coding a binary shape signal; and, more particularly, to a method and an apparatus for encoding a motion vector of the binary shape signal.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can have an access to and manipulate. A VOP can be referred to as an object and represented by a bounding rectangle whose width and height may be smallest multiples of 16 pixels (a macroblock size) surrounding each object so that the encoder may process the input video image on a VOP-by-VOP basis.

A VOP described in MPEG-4 includes shape information and texture information consisting of luminance and chrominance data, wherein the shape information represented in binary shape signals is referred to as an alpha plane. The alpha plane is partitioned into a plurality of binary alpha blocks, wherein each binary alpha block (BAB) has 16×16 binary pixels, each pixel being "binary" in the sense that it can take on only one of two predetermined value. Each of the binary pixels is classified as either a background pixel or an object pixel, wherein the background pixel located outside the object in the alpha plane is used to assign a binary pixel value, e.g., 0, while the object pixel inside the object is used to assign another binary pixel value, e.g., 255.

Each of the binary pixels in the BAB may be encoded by using a conventional bit-map-based shape coding method such as a context-based arithmetic encoding (CAE) discipline. For instance, in an intra mode, all binary pixels of a BAB are encoded by using an intra-CAE discipline to thereby generate an intra coded BAB, wherein a context value for each binary pixel of the BAB in the intra-CAE discipline is calculated by using binary pixel values of a predetermined number, e.g., 10, of binary pixels surrounding said each binary pixel in the BAB. In an inter mode, on the other hand, all binary pixels of a current BAB are encoded by using an inter-CAE discipline to thereby generate an inter encoded BAB, wherein a context value of each binary pixel of the current BAB in the inter-CAE discipline is calculated by using binary pixel values of a predetermined number, e.g., 4, of binary pixels surrounding said each binary pixel in the current BAB and binary values of a predetermined number, e.g., 5, of binary pixels within a bordered motion compensated BAB (see MPEG-4 Video Verification Model Version 7.0, International Organisation for Standardisation, Coding of Moving Pictures And Associated Audio Information, ISO/IEC JTC1/SC29/WG11 MPEG97/N1642, Bristol, April 1997, pp 28–30).

Meanwhile, in the conventional binary shape encoding discipline, a mode signal representing or characterizing a corresponding encoding condition for the BAB is encoded to improve the coding efficiency, thereby generating and then transmitting a corresponding encoded mode signal.

For example, if all of the binary pixels within a BAB are object pixels, instead of encoding the binary pixel values of the object pixels to generate encoded binary pixel values to be transmitted, it will be preferable to encode a mode signal indicating that all of the binary pixels within the BAB are object pixels. By employing the method described above, i.e., by transmitting the corresponding encoded mode signal as binary shape information for the BAB, it is possible to enhance the coding efficiency.

Referring to Table 1, there are 7 number of modes for the binary alpha information of a BAB according to a conventional mode coding discipline, wherein a motion vector difference for shape (MVD) of the BAB is a difference between a motion vector for shape (MV) and a motion vector predictor for shape (MVP); and the MVP is determined by using a conventional motion estimation discipline (see MPEG-4 Video Verification Model Version 7.0, International Organization for Standardization, Coding of Moving Pictures And Associated Audio Information, ISO/IEC JTC1/SC29/WG11 MPEG97/N1642, Bristol, April 1997, pp 20–23).

TABLE 1

Coding Modes

| mode | coding condition |
| --- | --- |
| 0 | MVD==0 && no_update |
| 1 | MVD!=0 && no_update |
| 2 | all_0 |
| 3 | all_255 |
| 4 | intra-CAE |
| 5 | MVD==0 && inter-CAE |
| 6 | MVD!=0 && inter-CAE |

Mode 0 represents that an MVD for a current BAB is zero and the current BAB can be represented by a most similar candidate BAB thereof, whereas mode 1 indicates that an MVD for a current BAB has a value other than zero and the current BAB can be represented by a most similar candidate BAB. For the current BAB of mode 0, only the mode signal is encoded; whereas the current BAB of mode 1 is represented by the mode signal and the MVD thereof. In determining "no_update", a difference BAB is formed by a difference between each pixel of the most similar BAB and a corresponding pixel thereof in a current BAB and it is checked whether an error for any of 4×4 subblocks of 4×4 pixels included in the difference BAB is less than a predetermined threshold, an error of a subblock being, e.g., a sum of absolute pixel values within the subblock. If the error values of all the subblocks are equal to or less than the threshold, the current BAB is declared as of mode 0 or 1 depending on the value of the MVD thereof.

Similarly, if an error for any of the 4×4 subblocks is equal to or less than the threshold when the pixels in the current BAB are all changed to 0, the current BAB is coded as an "all_0" mode, i.e., mode 2. If an error for any of the 4×4 subblocks is equal to or less than the threshold when the pixels in the current BAB are all changed to 255, the current BAB is coded as an "all_255" mode, i.e., mode 3. For the current BAB of mode 2 or 3, only the mode signal is encoded for the current BAB. When a current BAB does not belong to any one of modes 0 to 3, either "intra-CAE" or "inter-CAE" is employed for the coding of the current BAB, whereas a current BAB of mode 4 is represented by the mode signal and intra-CAE coded BAB data. A current BAB of mode 5 is represented by the mode signal and inter-CAE coded BAB data; and a current BAB of mode 6 is represented by the mode signal, inter-CAE coded BAB data and an MVD.

Conventional binary shape encoding methods employing the conventional mode coding method described above are basically progressive coding methods. Namely, in the conventional binary shape encoding methods, an interlaced coding technique performed by using a field-based motion estimation method has not been used. However, in order to enhance the coding efficiency when the spatial and/or temporal correlation between frames is lower than that of fields, the interlaced coding technique has been adapted to the encoding of the binary shape signal. An exemplary method and apparatus for adaptively coding the binary shape signal by using the progressive coding and the interlaced coding techniques is disclosed in a commonly owned copending application, U.S. Ser. No. 08/984,037, filed on Dec. 2, 1997 and entitled "METHOD AND APPARATUS FOR ENCODING MODE SIGNALS FOR USE IN A BINARY SHAPE CODER", whose contents are incorporated by reference to the extent necessary to understand the present invention.

Like the binary shape signal, i.e., shape information, the texture information may also be adaptively encoded by using the progressive coding and the interlaced coding techniques to improve its coding efficiency.

As a result of the adaptive coding processes, if the shape information and the texture information are encoded by the progressive coding technique, frame-based motion vectors may be generated according to a frame-based motion estimation method and, if otherwise, field-based motion vectors may be produced based on a field-based motion estimation method.

However, the conventional binary shape coding method uses only the frame-based motion vectors for encoding the motion vector of the binary shape signal.

SUMMARY OF THE INVENTION

It is, therefore, a primary object of the invention to provide a method and an apparatus, for use in adaptively encoding a binary shape signal by using a progressive and an interlaced coding techniques, for effectively encoding a motion vector of the binary shape signal by using frame-based motion vectors and field-based motion vectors.

In accordance with one aspect of the present invention, there is provided a method, for use in a video signal encoder which encodes a video signal comprised of texture information and shape information by selectively using a progressive or an interlaced coding technique, for encoding a motion vector of the shape information, wherein the shape information is divided into a multiplicity of BABs of M×N binary pixels and the texture information has a plurality of macroblocks of the same number of pixels as that of a BAB, M and N being positive integers, respectively, comprising the steps of: (a) deciding an encoding_type representing the more effective coding technique between the progressive and the interlaced coding techniques for encoding a target BAB; (b) detecting, in response to the encoding_type, a motion vector predictor corresponding to the target BAB among candidate motion vector predictors including frame-based and field-based motion vectors for the shape and the texture information; (c) determining the motion vector of the target BAB based on the detected motion vector predictor; and (d) encoding the motion vector of the target BAB.

In accordance with another aspect of the present invention, there is provided an apparatus, for use in a video signal encoder which encodes a video signal comprised of texture information and shape information by selectively using a progressive or an interlaced coding technique, for encoding a motion vector of the shape information, wherein the shape information is divided into a multiplicity of BABs of M×N binary pixels and the texture information has a plurality of macroblocks of the same number of pixels as that of a BAB, M and N being positive integers, respectively, which comprises: an encoding_type decision block for determining the more effective coding technique between the progressive and the interlaced coding techniques for encoding a target BAB to thereby produce an encoding_type signal; a re-forming block for providing, in response to the encoding_type signal, either the target BAB or a top- and a bottom-field BABs which are generated by dividing the target BAB according to the interlaced coding technique; an MVP determination block for detecting a frame-based or a field-based motion vector predictor corresponding to the target BAB or the top- and the bottom-field BABs among candidate motion vector predictors including frame-based and field-based motion vectors for the shape and the texture information; a motion estimation block for deciding the motion vector corresponding to the target BAB by using the detected motion vector predictor; and a motion vector encoding block for coding the motion vector corresponding to the target BAB.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
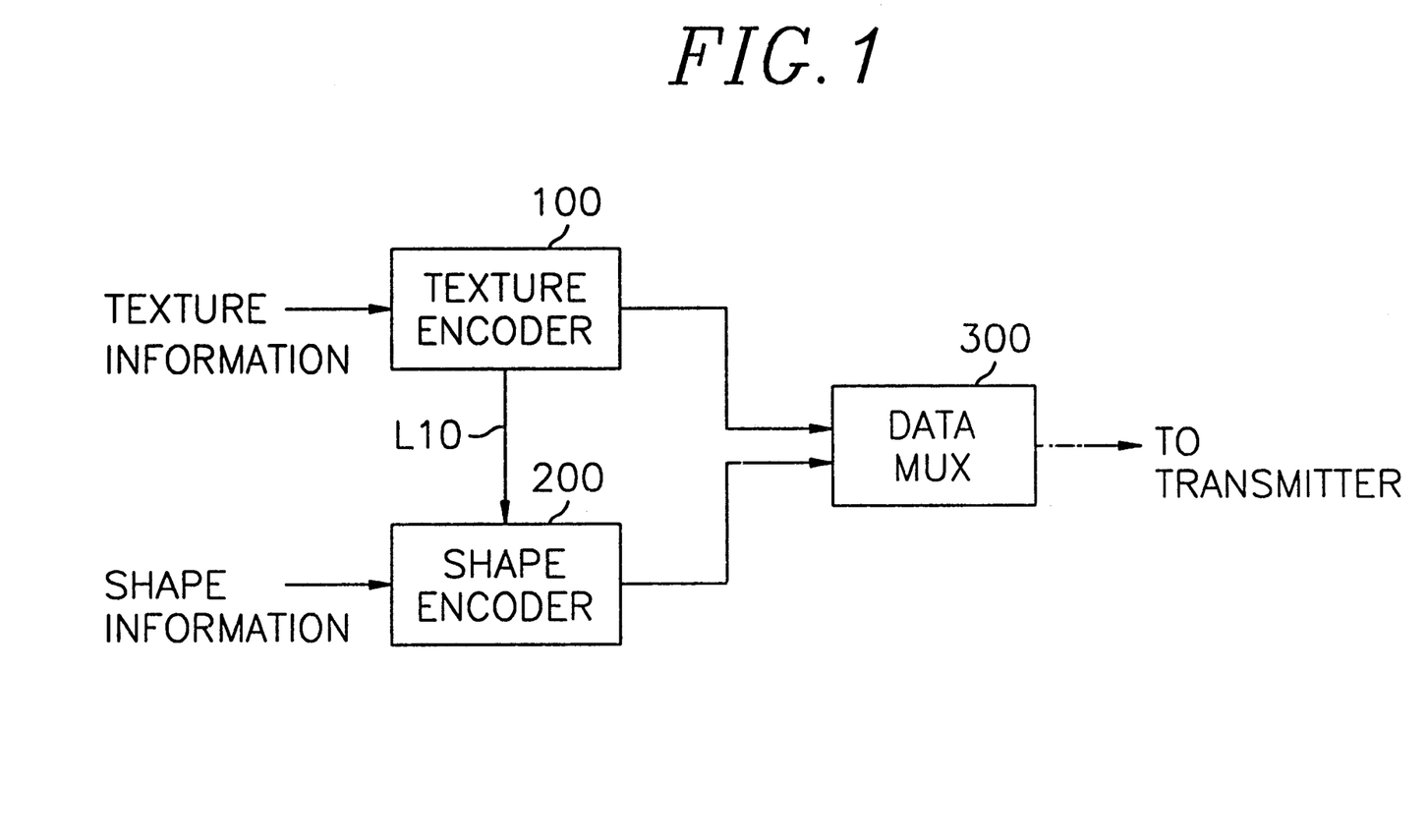
FIG. 1 shows a block diagram of a video signal encoder.

Referring to FIG. 1, there is provided a block diagram of a video signal encoder for coding texture information and shape information for an object in a frame (or VOP). The texture information is expressed by a plurality of macroblocks of M×N pixels, e.g., 16×16 pixels and the shape information is represented by a multiplicity of binary alpha blocks (BABs) of the same number of pixels as a macroblock, M and N being positive integers, respectively.

A texture encoder 100 adaptively encodes the texture information coupled thereto on a macroblock basis by using either a progressive or an interlaced coding technique. According to the interlaced coding technique, a macroblock is divided into a top- and a bottom-field macroblocks, each field macroblock having M/2×N pixels, e.g., 8×16 pixels, and the two field macroblocks are encoded on a field-by-field basis. On the other hand, in the progressive coding technique, a macroblock is encoded without any process such as the above division process.

As results of the above texture encoding processes, the texture encoder 100 provides encoded texture information to a data MUX 300 and also supplies motion vector information for texture, which is generated by encoding the macroblock by using either the progressive or the interlaced coding technique, to a shape encoder 200 via a line L10. In the above, if there is no motion vector corresponding to the macroblock, the motion vector information for texture includes data representing the absence of a motion vector corresponding to the macroblock and, if a motion vector exists, it includes the motion vector.

More specifically, if the macroblock is inter-coded by using the progressive coding technique, there is one frame-based motion vector corresponding to the macroblock. On the other hand, if the macroblock is inter-coded by using the interlaced coding technique, there are two field-based motion vectors, i.e., a top- and a bottom-field motion vectors, corresponding to the top- and bottom-field macroblocks, respectively. Meanwhile, if the macroblock is intra-coded, its corresponding motion vector is undefined and there is no motion vector.

The shape encoder 200 also adaptively encodes the shape information fed thereto on a BAB-by-BAB basis by using either the progressive or the interlaced coding technique and provides encoded shape information to the data MUX 300.

The data MUX 300 multiplexes the encoded texture information provided from the texture encoder 100 and the encoded shape information supplied from the shape encoder 200 to thereby provide an encoded video signal to a transmitter (not shown) for the transmission thereof.

Figure 2:
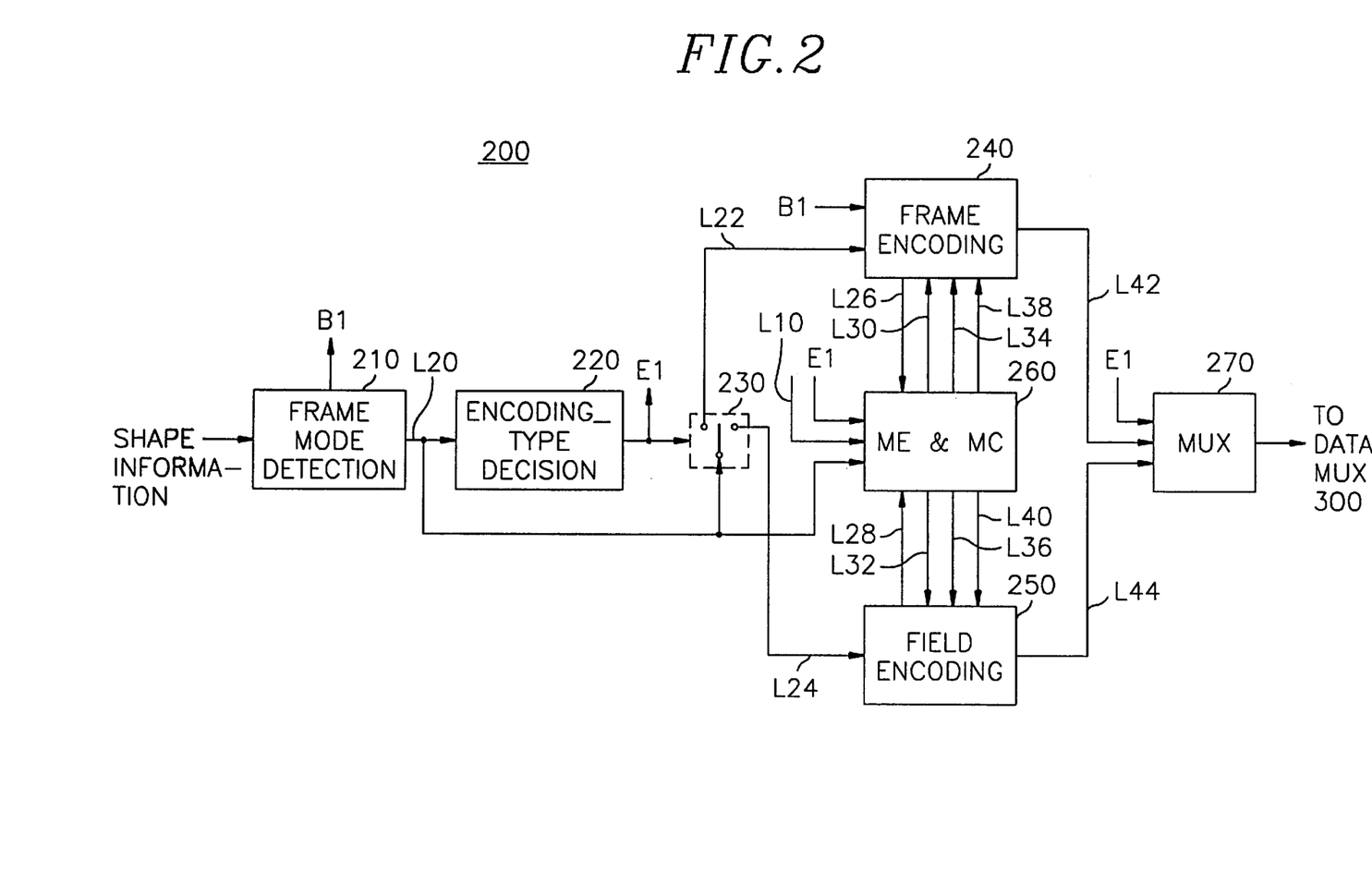
FIG. 2 is a block diagram of the shape encoder 200 in FIG. 1 in accordance with the present invention.

Referring to FIG. 2, there is shown a block diagram of the shape encoder 200 in FIG. 1 in accordance with an embodiment of the present invention. The shape information is coupled to a frame mode detection circuit 210 as a current BAB.

The frame mode detection circuit 210 examines whether a coding mode of the current BAB is "all_0" or "all_255". Specifically, the current BAB is partitioned into T×S pixels, e.g., 4×4 binary pixels, T and S being positive integers, respectively, and, therefore, the current BAB has 4 subblocks, each subblock containing 4×4 binary pixels.

If an error between any subblock of the current BAB and a subblock of an all_0 BAB is smaller than or equal to a predetermined threshold, an indication signal B1 of type 1 which indicates that the coding mode of the current BAB is "all_0" is provided from the frame mode detection circuit 210 to a frame encoding circuit 240, wherein the all_0 BAB is a BAB in which each pixel value is 0.

If an error between any subblock of the current BAB and a subblock of an all_255 BAB is smaller than or equal to the predetermined threshold, an indication signal B1 of type 2 which indicates that the coding mode of the current BAB is "all_255" is provided from the frame mode detection circuit 210 to the frame encoding circuit 240, wherein the all_255 BAB is a BAB each of whose pixel values is 255.

If the coding mode of the current BAB is determined as neither "all_0" nor "all_255", the frame mode detection circuit 210 provides the current BAB to an encoding_type decision circuit 220, a switch 230 and a motion estimation and motion compensation (ME & MC) circuit 260 via a line L20.

The encoding_type decision circuit 220 determines whether the progressive coding technique or the interlaced coding technique is more effective at encoding the current BAB provided from the frame mode detection circuit 210. This determination is made by comparing spatial correlation between pixel rows in a frame-based current BAB and a field-based current BAB, as illustrated in the aforementioned MPEG-4 Video Verification Model Version 7.0 publication, ISO/IEC JTC1/SC29/WG11MPEG97/N1642, Bristol, April 1997, p. 54. The output of this determination is an encoding_type signal E1 representing the determined coding technique. The encoding_type signal E1 is provided to the switch 230, the ME & MC circuit 260 and a multiplexor (MUX) 270.

The switch 230 provides the current BAB transmitted via the line L20 to either the frame encoding circuit 240 via a line L22 or a field encoding circuit 250 via a line L24 in response to the encoding_type signal E1. To be more specific, if the encoding_type signal E1 represents the progressive coding technique, the current BAB is coupled to the frame encoding circuit 240 and, if otherwise, the current BAB is fed to the field encoding circuit 250. Thereafter, either the frame encoding circuit 240 or the field encoding circuit 250 performs its operation depending on which the current BAB is inputted to.

If the current BAB is coupled to the frame encoding circuit 240 through the line L22, the frame encoding circuit 240 encodes the current BAB in cooperation with the ME & MC circuit 260 by using frame-based coding, i.e., the progressive coding technique, thereby generating frame-coded data and a frame mode signal corresponding to the current BAB, wherein the frame mode signal represents a coding condition of the frame-coded data and shows one of 7 modes described in Table 1 in the prior art. Specifically, the selection of the mode between the modes 2 and 3, i.e., "all_0" and "all_255" modes, is determined based only on the indication signal B1 provided from the frame mode detection circuit 210. The frame-coded data which contains an encoded frame mode signal therein is provided to the MUX 270 through a line L42 and the frame mode signal is transferred to the ME & MC circuit 260 via a line L26.

In contrast, if the current BAB is inputted to the field encoding circuit 250 via the line L24, the field encoding circuit 250 encodes the current BAB in cooperation with the ME & MC circuit 260 by using field-based coding, i.e., the interlaced coding technique, thereby producing field-coded data and a field mode signal corresponding to the current BAB, wherein the field mode signal depicts a coding condition of the field-coded data and represents one of 5 modes described in Table 1 except modes 2 and 3 since the modes 2 and 3 are determined only at the frame encoding circuit 240 as aforementioned. The field-coded data which contains an encoded field mode signal is supplied to the MUX 270 through a line L44 and the field mode signal is delivered to the ME & MC circuit 260 via a line L28.

The MUX 270 multiplexes the frame-encoded data and the field-encoded data together with the encoding_type signal E1 to provide the encoded shape information to the data MUX 300 in FIG. 1.

Figure 3:
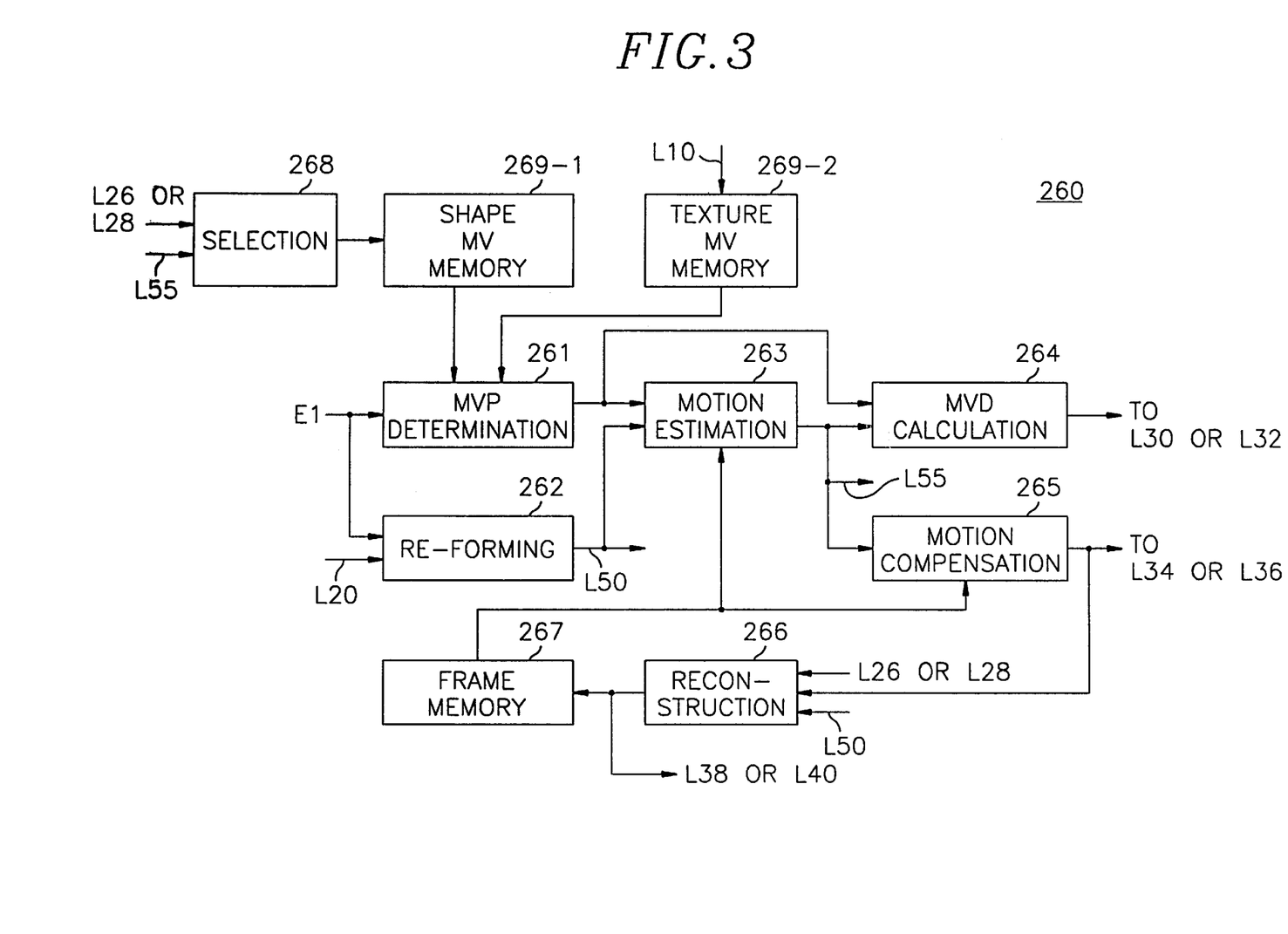
FIG. 3 represents a detailed block diagram of the motion estimation & motion compensation circuit 260 in FIG. 2.

In the above, the cooperation between either the frame encoding circuit 240 or the field coding circuit 250 and the ME & MC circuit 260 will be illustrated referring to FIG. 3.

The ME & MC circuit 260 performs a frame-based or field-based motion estimation procedure on the current BAB based on the current BAB on the line L20, the encoding_type signal E1, the motion vector information on texture provided from the texture encoder 100 in FIG. 1 via the line L10, and either the frame mode signal on the line L26 or field mode signal on the line L28.

Referring to FIG. 3, there is shown a detailed block diagram of the ME & MC circuit 260 in FIG. 2 in accordance with the embodiment of the present invention.

The motion vector information on texture provided from the texture encoder 100 in FIG. 1 is stored at a texture MV memory 269-2.

The current BAB coupled to the ME & MC circuit 260 via the line L20 is inputted to a re-forming block 262. In response to the encoding_type signal E1, the re-forming block 262 either divides the current BAB into a top- and a bottom-field BABs and provides the top- and the bottom-field BABs onto a line L50, or directly transfers the current BAB onto the line L50, wherein the top-field BAB preferably contains every odd row of the current BAB and the bottom-field BAB includes every even row of the current BAB. Either the current BAB or the top- and the bottom-field BABs outputted from the re-forming block 262 are provided to a motion estimation block 263 and a reconstruction block 266 via the line L50.

In the meantime, an MVP determination block 261 detects a motion vector predictor for shape (MVP) corresponding to the current BAB among a plurality of candidate MVPs stored at a shape MV memory 269-1 and the texture MV memory 269-2 according to predetermined rules in accordance with the present invention in response to the encoding_type signal E1. The MVP detection procedure will be illustrated later with reference to FIGS. 4A to 4C and FIGS. 5A and 5B.

In accordance with the present invention, since the shape information and the texture information of the video signal are adaptively encoded by using the progressive and the interlaced coding techniques, the shape MV memory 269-1 also stores motion vector information on shape which is similar to the motion vector information on texture stored at the texture MV memory 269-2. That is, if there is no motion vector corresponding to the current BAB, the motion vector information on the shape contains data representing the absence of a motion vector corresponding to the current BAB and, if a motion vector exists, it includes the motion vector as well as the motion vector information on the texture. In reference to the coding modes of the binary shape signal shown in Table 1, if the coding mode of the current BAB is determined as one of modes 0, 1, 5 and 6, there exists at least one motion vector for the current BAB and, if the coding mode becomes one of modes 2, 3 and 4, there is no motion vector for the current BAB since no motion vector is defined for modes 2, 3 and 4.

In addition, if the current BAB is encoded by the progressive coding technique, the motion vector information on the shape corresponding thereto may include one frame-based motion vector and, if it is encoded by the interlaced coding technique, it may have two field-based motion vectors, i.e., a top- and a bottom-field motion vectors, corresponding to the top- and the bottom-field BABs of the current BAB since the top- and the bottom-field BABs are encoded on the field-by-field basis.

In the above, the motion vector information on the shape is determined at a selection block 268 based on the mode signal for each BAB on the line L26 or L28 and a motion vector (MV) on a line L55 which may either be generated or not generated for each BAB at the motion estimation block 263.

Namely, if the coding mode of a BAB is one of the modes 2, 3 and 4, although there is a corresponding motion vector, the motion vector is not meaningful. Therefore, in that case, the selection block 268 provides the motion vector information on the shape representing there is no motion vector to the shape MV memory 269-1. On the other hand, if the coding mode of the BAB is one of the modes 0, 1, 5 and 6, there exists at least one motion vector for the BAB and, therefore, the motion vector information on the shape containing the motion vector is coupled to the shape MV memory 269-1.

According to the above illustration, the frame-based motion vectors and the field-based motion vectors stored at the shape MV memory 269-1 and the texture MV memory 269-2 can be the candidate MVPs. Therefore, among the candidate MVPs, the MVP determination block 261 detects either a frame-based MVP or a field-based MVP for the current BAB in response to the encoding_type signal E1.

If the current BAB is encoded by the progressive coding technique, i.e., the encoding_type signal E1 represents the frame-based coding, the frame-based MVP for the current BAB is generated. On the other hand, if the current BAB is encoded by the interlaced coding technique, i.e., the encoding_type signal E1 represents the field-based coding, the field-based MVP, including a top- and a bottom-field MVPs corresponding to the top- and the bottom-field BABs, respectively, for the current BAB is produced.

Then, the MVP determination block 261 provides the determined MVP, i.e., either the frame-based or the field-based MVP, to the motion estimation block 263 and an MVD calculation block 264.

The motion estimation block 263 determines either a frame-based or a field-based motion vector (MV) for the current BAB based on either the frame-based or the field-based MVP provided from the MVP determination block 261, either the current BAB or the top- and the bottom-field BABs outputted from the re-forming block 262 and a previous frame retrieved from a frame memory 267.

For instance, as disclosed in MPEG-4 supra, the frame-based MV for the current BAB is determined based on its frame-based MVP by the following frame-based motion estimation procedure. An MC error is computed by comparing the BAB indicated by the frame-based MVP and the current BAB. If the computed MC error is less or equal to a predetermined threshold for any 4×4 subblocks, the frame-based MVP is directly employed as the frame-based MV, and the procedure terminates.

However, if the above condition is not satisfied, candidate motion vectors are searched around the frame-based MVP while computing 16×16 MC errors by comparing the BABs indicated by the candidate motion vectors and the current BAB. The search range is, e.g., +/−16 pixels, around the frame-based MVP along both horizontal and vertical directions. Thereafter, a candidate motion vector that minimizes the MC error is taken as the frame-based MV of the current BAB.

The field-based motion estimation procedure is also performed on each field BAB in the same manner as shown in the frame-based motion estimation procedure.

The MV of the current BAB, i.e., either the frame-based or the field-based MV, is provided to the MVD calculation block 264, the motion compensation block 265 and the selection block 268 via the line L55.

The MVD calculation block 264 computes a motion vector difference for shape (MVD) corresponding to the current BAB, the MVD representing a difference between the MV and the MVP, and provides the MVD onto a line L30 or L32 depending on the encoding_type of the current BAB.

The motion compensation block 265 produces a motion compensated BAB based on the MV derived from the motion estimation block 263 and the previous frame retrieved from the frame memory 267 through the use of a conventional motion compensation method; supplies the motion compensated BAB onto a line either L34 or L36 depending on the encoding_type of the current BAB; and provides same to the reconstruction block 266.

The reconstruction block 266 generates a reconstructed BAB by selecting the motion compensated BAB provided from the motion compensation block 265 or either the current BAB or the top- and the bottom-field BABs on the line L50 derived from the re-forming block 262 in response to the mode signal of the current BAB on the line L26 or L28. On the other hand, if the mode signal on the line L26 outputted from the frame encoding circuit 240 represents one of the modes 2 and 3, the reconstructed BAB becomes either all_0 BAB or all_255 BAB.

The reconstructed BAB is supplied onto a line either L38 or L40 depending on the encoding_type of the current BAB and provided to the frame memory 267 in order to produce a reconstructed current frame, wherein the reconstructed current frame is stored at the frame memory 267 as the previous frame.

In the above, if the current BAB is encoded according to the progressive coding technique, outputs of the MVD calculation block 264, the motion compensation block 265 and the reconstruction block 266 are produced on the frame-by-frame basis and inputted to the frame encoding circuit 240 via the lines L30, L34 and L38, respectively, and, if otherwise, they are generated on the field-by-field basis and fed to the field encoding circuit 250 via the lines L32, L36 and L40, respectively.

Thereafter, the frame encoding circuit 240 determines the coding mode of the current BAB and produces the frame-coded data based on the indication signal B1, the current BAB transferred thereto via the switch 230, the frame-based MVD on the line L30, the motion compensated BAB on the line L34 and the reconstructed BAB on the line L38 in the same manner as disclosed in the prior art.

Similarly, the field encoding circuit 250 decides the coding modes of the top- and the bottom-field BABs corresponding to the current BAB and generates the field-coded data corresponding to the top- and the bottom-field BABs based on the current BAB coupled thereto via the switch 230, the field-based MVD on the line L32, the motion compensated BABs corresponding to the top- and the bottom-field BABs on the line L36 and the reconstructed BAB on the line L40.

Hereinafter, a motion vector determination and encoding procedure will be illustrated more specifically referring to FIGS. 4A to 4C and FIGS. 5A and 5B.

Figure 5A:
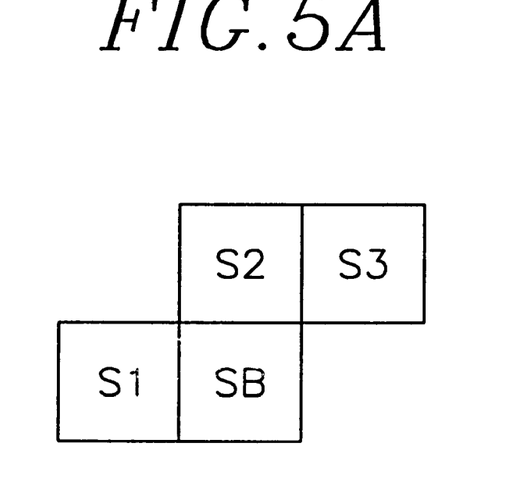
FIGS. 5A and 5B illustrate the motion vector predictor determination process.
Figure 5B:
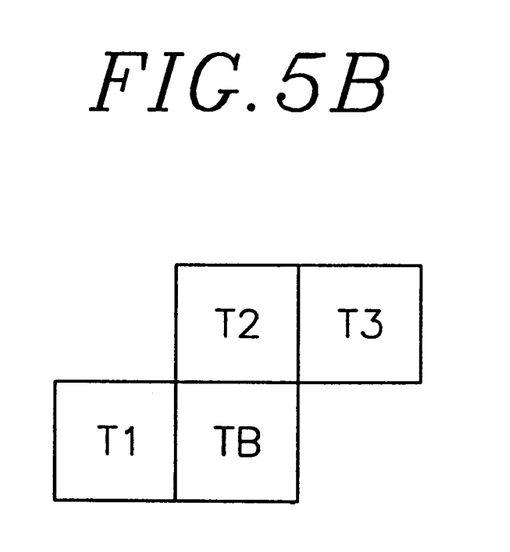

In accordance with the present invention, the MVP for the current BAB is selected among a plurality of candidate MVPs composed of motion vectors for shape of BABs, e.g., S1 to S3, surrounding the current BAB, e.g., SB, as shown in FIG. 5A and motion vectors for texture of macroblocks, e.g., T1 to T3, surrounding the macroblock, e.g., TB corresponding to the current BAB SB, as depicted in FIG. 5B.

Each of the BABs surrounding the current BAB and the macroblocks surrounding the macroblock corresponding to the current BAB has either a frame-based motion vector or a field-based motion vector including a top- and a bottom-field motion vectors depending on its encoding_type.

Therefore, in order to determine the frame- or the field-based MVP of the current BAB, the candidate MVPs are traversed according to priority determined by MPEG-4 and the encoding_type of the current BAB. According to MPEG-4, the BABs S1 to S3 surrounding the current BAB SB have a priority in the order of S1, S2 and S3 as shown in FIG. 5A and, similarly, the macroblocks T1 to T3 surrounding the macroblock TB are traversed in the order of T1, T2 and T3. The priority depending on the encoding_type will be described by making reference to FIGS. 4A to 4C.

Figure 4A:
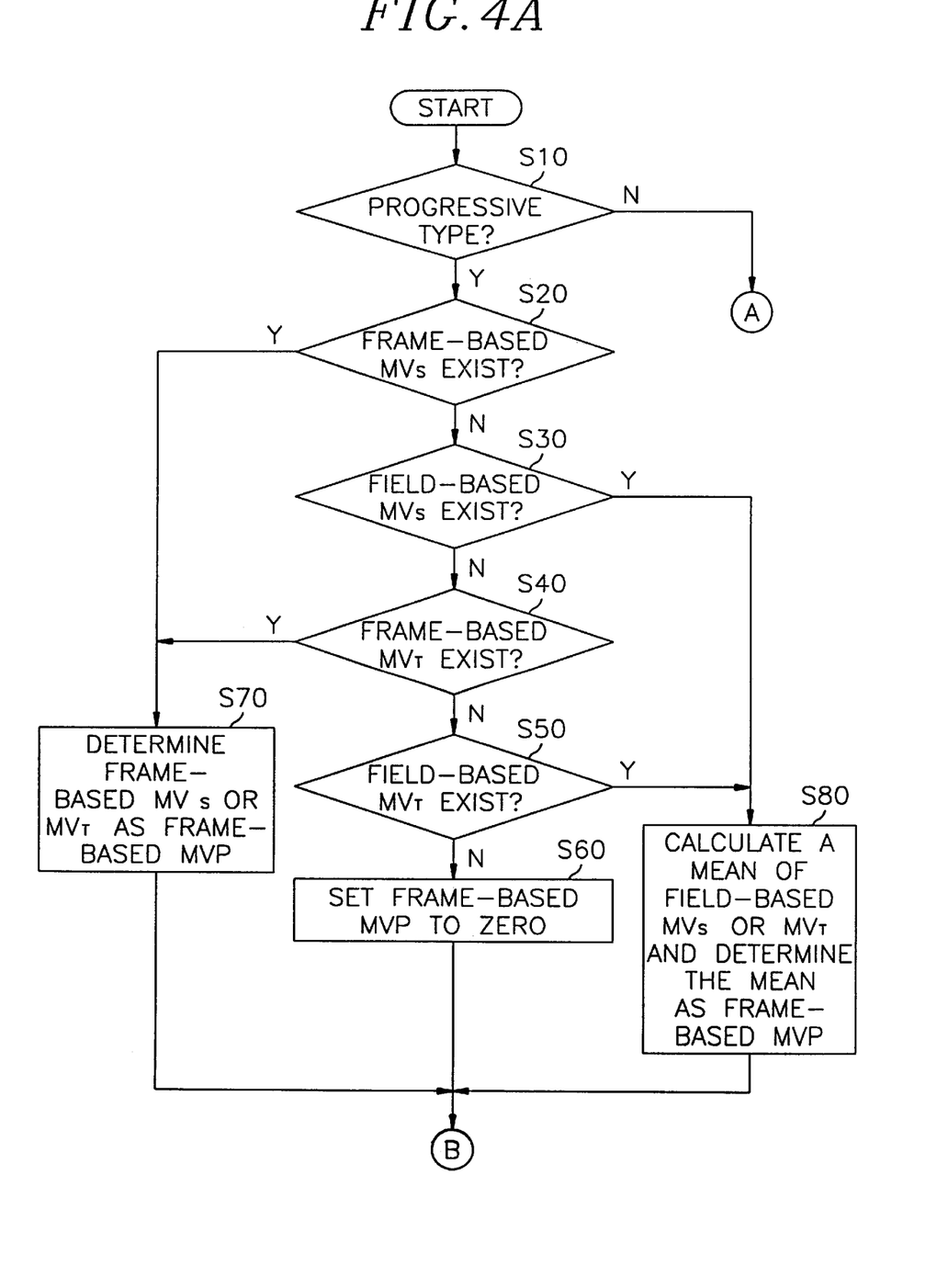
FIGS. 4A to 4C provide a flow chart showing the motion vector encoding process in accordance with the present invention.

In FIG. 4A, at step S10, it is checked whether the encoding_type of the current BAB determined at the encoding_type decision circuit 220 in FIG. 2 is the progressive coding type. If the encoding_type of the current BAB is determined as the progressive coding type at step S10, among the candidate MVPs, the frame-based motion vectors are traversed prior to the field-based motion vectors. Therefore, in order to determine the frame-based MVP of the current BAB, the procedure first proceeds to step S20.

At step S20, it is detected whether there exists an appropriate frame-based motion vector for shape ($MV_S$) among the candidate MVPs in the order of S1 to S3 in FIG. 5A.

If there is the frame-based $MV_S$, the procedure goes to step S70 and the detected frame-based $MV_S$ is determined as the frame-based MVP of the current BAB at step S70. The procedure goes to step S90 thereafter.

If otherwise, at step S30, it is observed whether there exists an appropriate field-based $MV_S$ among the candidate MVPs in the order of S1 to S3 in FIG. 5A.

As a result of the detection process at step S30, if there is the field-based $MV_S$ including a top- and a bottom-field motion vectors, the procedure proceeds to step S80.

At step S80, a mean of the top- and the bottom-field motion vectors included in the field-based $MV_S$ is calculated and the mean is determined as the frame-based MVP of the current BAB. The procedure goes to step S90 thereafter.

If no field-based $MV_S$ is detected at step S30, at step S40, it is checked whether there is an appropriate frame-based motion vector for texture ($MV_T$) among the candidate MVPs in the order of T1 to T3 in FIG. 5B.

If there is the frame-based $MV_T$, the frame-based $MV_T$ is determined as the frame-based MVP of the current BAB at step 70 and, if otherwise, the procedure proceeds to step S50.

Referring to step S50, it is checked whether there exists an appropriate field-based $MV_T$ among the candidate MVPs in the same sequence as that at step S40. If there is the field-based $MV_T$ including a top- and a bottom-field motion vectors, the procedure goes to step S80.

At step S80, a mean of the top- and the bottom-field motion vectors included in the field-based $MV_T$ is calculated and the mean is determined as the frame-based MVP of the current BAB. The procedure goes to step S90 thereafter.

On the other hand, as results of the detection processes at steps S20 to S50, if it is revealed that there is neither frame-based nor field-based motion vector among the candidate MVPs, the frame-based MVP of the current BAB is set to zero at step S60.

Steps S20 to S80 determining the frame-based MVP of the current BAB is performed at the MVP determination block 261 in FIG. 3.

Figure 4B:
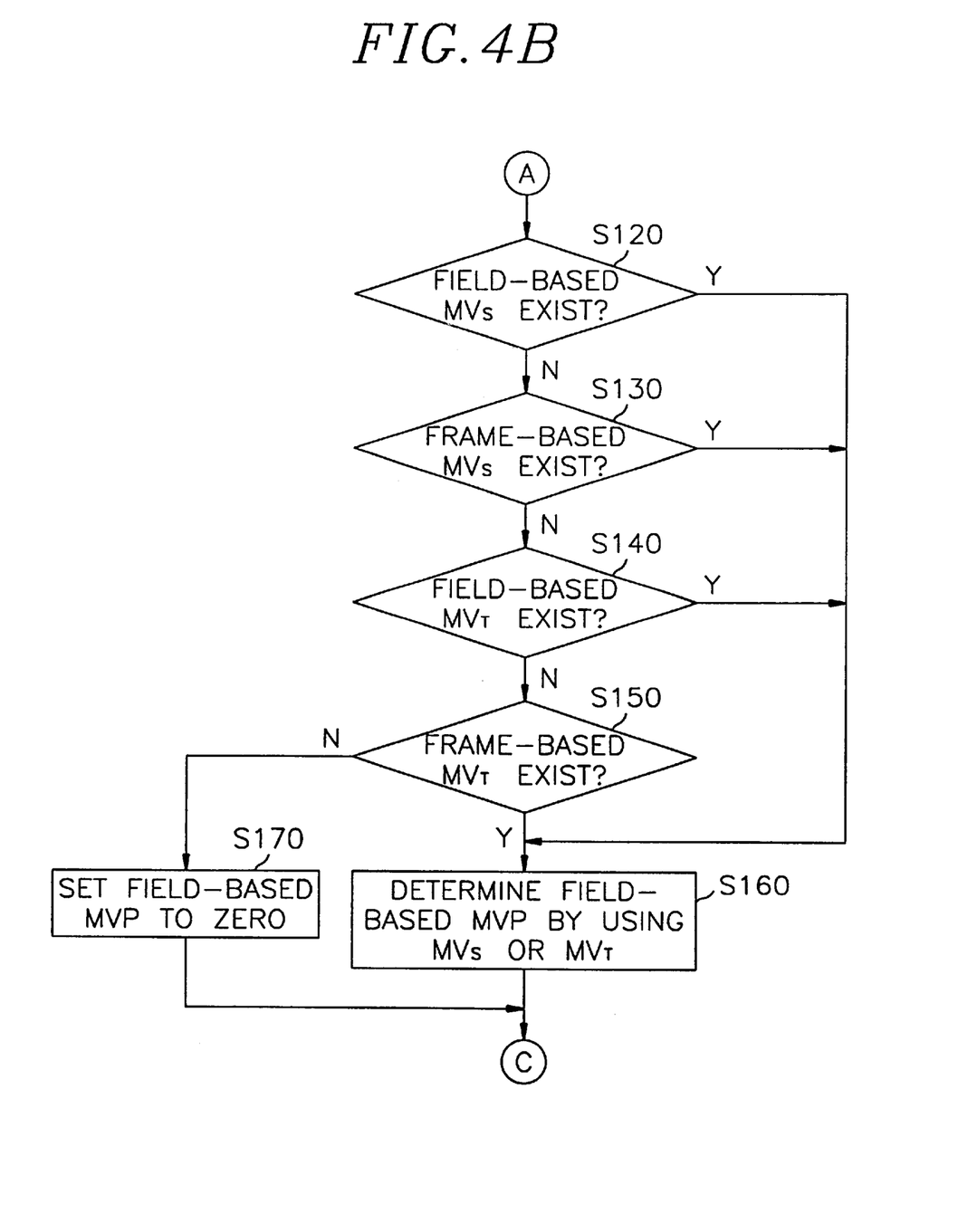
Figure 4C:
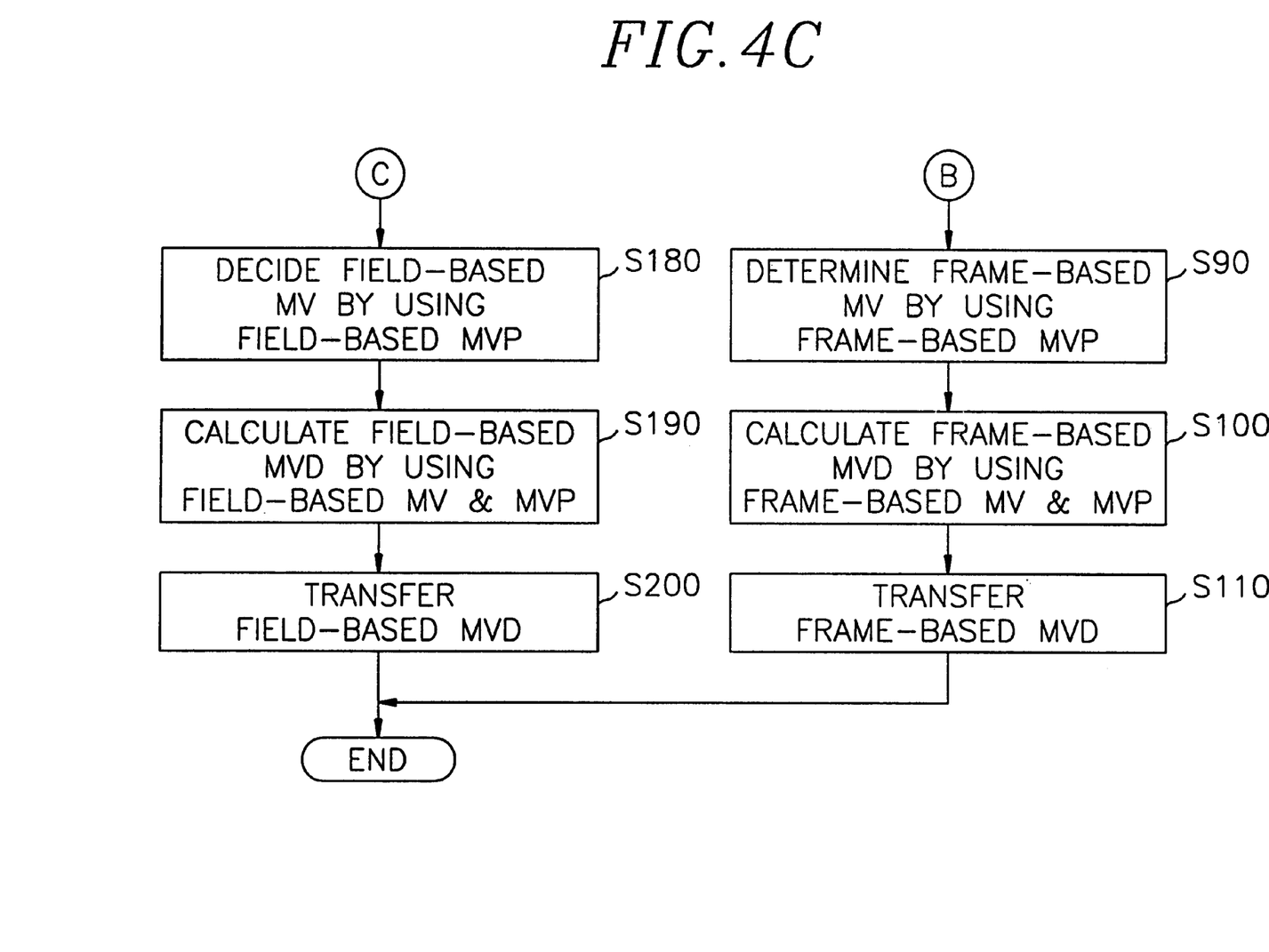

Then, the procedure goes to step S90 in FIG. 4C and, at step S90, the frame-based MV of the current BAB is decided based on the frame-based MVP of the current BAB according to MPEG-4 supra, as done at the motion estimation block 263 shown in FIG. 3.

At step S100, the frame-based MVD of the current BAB is calculated by subtracting the frame-based MVP from the frame-based MV of the current BAB.

Then, the frame-based MVD is transferred to the frame encoding circuit 240 via the line L30 as shown in FIG. 2 at step S110 and this motion vector determination and encoding procedure terminates.

On the other hand, at step S10 in FIG. 4A, if the encoding_type of the current BAB is not the progressive coding type, i.e., if the current BAB is encoded by the interlaced coding technique, the field-based motion vectors are traversed prior to the frame-based motion vectors and the procedure goes to step S120 in FIG. 4B.

At step S120, it is detected whether there exists an appropriate field-based $MV_S$ including a top- and a bottom-field motion vectors among the candidate MVPs in the order of S1 to S3 in FIG. 5A. If there is the field-based $MV_S$, the procedure goes to step S160.

At step S160, the field-based MVP including the top- and the bottom-field MVPs is determined based on the field-based $MV_S$, wherein the top- and the bottom-field MVPs correspond to the top- and the bottom-field BABs of the current BAB, respectively.

In accordance with the embodiment of the present invention, the top-field motion vector of the field-based $MV_S$ is determined as the top-field MVP and the bottom-field motion vector is decided as the bottom-field MVP of the current BAB.

In accordance with another embodiment of the present invention, the bottom-field motion vector of the field-based $MV_S$ is determined as the top- and the bottom-field MVPs of the current BAB.

On the other hand, if the appropriate field-based $MV_S$ is not selected at step S120, at step S130, it is examined whether there exists an appropriate frame-based $MV_S$ among the candidate MVPs in the order of S1 to S3.

If there is the frame-based $MV_S$, the frame-based $MV_S$ is decided as the top- and the bottom-field MVPs of the current BAB at S160, and, if otherwise, the procedure goes to step S140.

At step S140, it is checked whether there is a field-based $MV_T$ including a top- and a bottom-field motion vectors among the candidate MVPs in the order of T1 to T3 in FIG. 5B.

If it is determined that there is the field-based $MV_T$, the field-based MVP of the current BAB is determined at step S160 in the same manner as in determining the field-based MVP by using the field-based $MV_S$ as shown above.

On the other hand, if the field-based $MV_T$ is not detected at step S140, at step S150, it is checked whether there is a frame-based $MV_T$ among the candidate MVPs in the same sequence as that at step S140.

If there is the frame-based $MV_T$, the frame-based $MV_T$ is determined as the top- and the bottom-field MVPs of the current BAB at step S160. Then, the procedure goes to step S180 in FIG. 4C.

As results of steps S120 to S150, if it is discovered that there is neither frame-based nor field-based motion vector among the candidate MVPs, the field-based MVP of the current BAB is set to zero at step S170. Then, the procedure goes to step S180 in FIG. 4C.

At step S180, the field-based MV of the current BAB is decided on the field-by-field basis according to MPEG-4 supra to thereby produce the top- and the bottom-field MVs of the current BAB.

If the field-based MV is determined at step S180, the field-based MVD is calculated by using the field-based MV and MVP of the current BAB on the field-by-field basis at step S190.

At step S200, the field-based MVD is transferred to the field encoding circuit 250 via the line L32 as shown in FIG. 2 and this motion vector determination and encoding procedure terminates.

While the present invention has been described with respect to certain preferred embodiments only, other modifications and variations may be made without departing from the spirit and scope of the present invention as set forth in the following claims.

What is claimed is:

1. A method, for use in a video signal encoder which encodes a video signal comprised of texture information and shape information by selectively using a progressive or an interlaced coding technique, for encoding a motion vector of the shape information, wherein the shape information is divided into a multiplicity of binary alpha blocks (BABs) of M×N binary pixels and the texture information has a plurality of macroblocks of the same number of pixels as that of a BAB, M and N being positive integers, respectively, comprising the steps of:

(a) deciding an encoding_type representing a more effective coding technique between the progressive and the interlaced coding techniques for encoding a target BAB;

(b) detecting, in response to the encoding_type, a motion vector predictor corresponding to the target BAB among candidate motion vector predictors including frame-based and field-based motion vectors for the shape and the texture information;

(c) determining the motion vector of the target BAB based on the detected motion vector predictor; and (d) encoding the motion vector of the target BAB.

2. The method according to claim 1, wherein the candidate motion vector predictors include frame-based and field-based motion vectors for BABs which surround the target BAB and have been previously encoded and frame-based and field-based motion vectors for macroblocks which surround the macroblock corresponding to the target BAB and also have been previously encoded, wherein each field-based motion vector has a top- and a bottom-field motion vectors corresponding to a top- and a bottom-field blocks, respectively, of a BAB or a macroblock.

3. The method according to claim 2, wherein, if the progressive coding type is decided as the encoding_type of the target BAB at the step (a), the step (b) detects the motion vector predictor as traversing the candidate motion vector predictors in the order of the frame-based motion vectors for the shape information, the field-based motion vectors for the shape information, the frame-based motion vectors for the texture information and the field-based motion vectors for the texture information.

4. The method according to claim 3, wherein, at the step (b), if one of the field-based motion vectors is selected to detect the motion vector predictor, the step (b) includes the steps of:

(b11) calculating a mean of the top- and the bottom-field motion vectors of the selected field-based motion vector; and (b12) determining the mean as the motion vector predictor.

5. The method according to claim 2, if the interlaced coding type is decided as the encoding_type of the target BAB at the step (a), the step (b) includes the steps of:

(b21) dividing the target BAB into a top- and a bottom-field BABs; and (b22) determining the motion vector predictor having a top- and a bottom-field motion vector predictors corresponding to the top- and the bottom-field BABs, respectively, as traversing the candidate motion vectors in the order of the field-based motion vectors for the shape information, the frame-based motion vectors for the shape information, the field-based motion vectors for the texture information and the frame-based motion vectors for the texture information.

6. The method according to claim 5, wherein, at the step (b22), if one of the frame-based motion vectors is selected to detect the top- and the bottom-field motion vector predictors, the step (b22) assigns the selected frame-based motion vector to the top- and the bottom-field BABs as the top- and the bottom-field motion vector predictors, respectively.

7. The method according to claim 5, wherein, at the step (b22), if one of the field-based motion vectors is selected to detect the top- and the bottom-field motion vector predictors, the step (b22) determines the top-field motion vector of the selected field-based motion vector as the top-field motion vector predictor and decides the bottom-field motion vector thereof as the bottom-field motion vector predictor.

8. The method according to claim 5, wherein, at the step (b22), if one of the field-based motion vectors is chosen to detect the top- and the bottom-field motion vector predictors, the step (b22) assigns the bottom-field motion vector of the selected field-based motion vector to the top- and the bottom-field BABs of the target BAB as the top- and the bottom-field motion vector predictors, respectively.

9. An apparatus, for use in a video signal encoder which encodes a video signal comprised of texture information and shape information by selectively using a progressive or an interlaced coding technique, for encoding a motion vector of the shape information, wherein the shape information is divided into a multiplicity of binary alpha blocks (BABs) of M×N binary pixels and the texture information has a plurality of macroblocks of the same number of pixels as that of a BAB, M and N being positive integers, respectively, which comprises:

means for determining a more effective coding technique between the progressive and the interlaced coding techniques for encoding a target BAB to thereby produce an encoding_type signal;

means for providing, in response to the encoding_type signal, either the target BAB or a top- and a bottom-field BABs which are generated by dividing the target BAB according to the interlaced coding technique;

a motion vector predictor (MVP) determination means for detecting a frame-based or a field-based motion vector predictor corresponding to either the target BAB or the top- and the bottom-field BABs among candidate motion vector predictors including frame-based and field-based motion vectors for the shape and the texture information;

means for deciding the motion vector corresponding to the target BAB by using the detected motion vector predictor; and means for encoding the motion vector corresponding to the target BAB.

10. The apparatus as recited in claim 9, wherein the candidate motion vector predictors include frame-based and field-based motion vectors corresponding to BABs which surround the target BAB and have been previously encoded and frame-based and field-based motion vectors corresponding to macroblocks which surround the macroblock corresponding to the target BAB and also have been previously encoded, wherein each field-based motion vector has a top- and a bottom-field motion vectors corresponding to a top- and a bottom-field blocks, respectively, of a BAB or a macroblock.

11. The apparatus as recited in claim 10, wherein the MVP determination means selects the frame-based motion vector predictor by traversing the candidate motion vector predictors in the order of the frame-based motion vectors for the shape information, the field-based motion vectors for the shape information, the frame-based motion vectors for the texture information and the field-based motion vectors for the texture information.

12. The apparatus as recited in claim 11, wherein, if the frame-based motion vector predictor is detected among the field-based motion vectors for the shape and the texture information, the MVP determination means calculates a mean of the top- and the bottom-field motion vectors of the detected field-based motion vector and determines the mean as the frame-based motion vector predictor.

13. The apparatus as recited in claim 10, wherein the MVP determination means chooses the field-based motion vector predictor, including a top- and a bottom-field motion vector predictors corresponding to the top- and the bottom-field BABs, respectively, by traversing the candidate motion vectors in the order of the field-based motion vectors for the shape information, the frame-based motion vectors for the shape information, the field-based motion vectors for the texture information and the frame-based motion vectors for the texture information.

14. The apparatus as recited in claim 13, wherein, if the field-based motion vector predictor is detected among the frame-based motion vectors for the shape and the texture information, the MVP determination means assigns the detected frame-based motion vector to the top- and the bottom-field BABs as the top- and the bottom-field motion vector predictors, respectively.

15. The apparatus as recited in claim 13, wherein, if the field-based motion vector predictor is detected among the field-based motion vectors for the shape and the texture information, the MVP determination means decides the top-field motion vector of the detected field-based motion vector as the top-field motion vector predictor and the bottom-field motion vector thereof as the bottom-field motion vector predictor.

16. The apparatus as recited in claim 13, wherein, if the field-based motion vector predictor is detected among the field-based motion vectors for the shape and the texture information, the MVP determination means assigns the bottom-field motion vector of the detected field-based motion vector to the top- and the bottom-field BABs of the target BAB as the top- and the bottom-field motion vector predictors, respectively.

* * * * *